United States Patent [19]

Deminet

[11] 4,197,977

[45] Apr. 15, 1980

[54] METHOD OF MAKING AN ACTIVELY-COOLED TITANIUM STRUCTURE

[75] Inventor: Czeslaw Deminet, Kent, Wash.

[73] Assignee: The Boeing Company, Seattle, Wash.

[21] Appl. No.: 898,277

[22] Filed: Apr. 20, 1978

[51] Int. Cl.² .................. B23K 19/00; B23K 31/02
[52] U.S. Cl. .................. 228/106; 29/157.3 V;
228/118; 228/157; 228/173 A; 228/181
[58] Field of Search .......... 228/106, 118, 157, 173 A,
228/265, 181, 193; 29/157.3 V

[56] References Cited

U.S. PATENT DOCUMENTS

| | | | |
|---|---|---|---|
| 3,435,504 | 4/1969 | Miller | 228/118 |
| 3,927,817 | 12/1975 | Hamilton et al. | 228/157 |
| 4,013,210 | 3/1977 | Deminet | 228/106 |
| 4,087,037 | 5/1978 | Schier et al. | 228/106 |
| 4,117,970 | 10/1978 | Hamilton et al. | 228/173 A |

*Primary Examiner*—Charlie T. Moon
*Assistant Examiner*—Kenneth J. Ramsey
*Attorney, Agent, or Firm*—Thomas H. Murray; Clifford A. Poff

[57] ABSTRACT

A composite titanium or titanium alloy structure is made by diffusion bonding upper and lower face sheet components onto opposite sides of a honeycomb core component at an elevated temperature within a furnace under a high vacuum. The components are supported in the furnace upon a slip sheet carried by a glass pad which is, in turn, supported by a lower platen. The weight of an upper platen is transmitted through a slip sheet to the upper face sheet component. The upper face sheet component includes an internal passageway which is coupled to an inert gas supply to expand the passageway by superplastic forming. The upper wall surface of the passageway is restrained by the upper platen so that only the lower wall surface of the passageway is displaced and received in underlying recesses in the honeycomb core component. After expansion, the displaced wall surface is diffusion bonded to the honeycomb core component. Preferably, the upper face sheet component is fabricated from two sheets which are joined together by diffusion bonding after a strip-like pattern of a stop-off coating, e.g., boron nitride, is deposited on one face sheet using silk-screening techniques. Only the uncoated surfaces between the sheets are diffusion bonded together.

9 Claims, 6 Drawing Figures

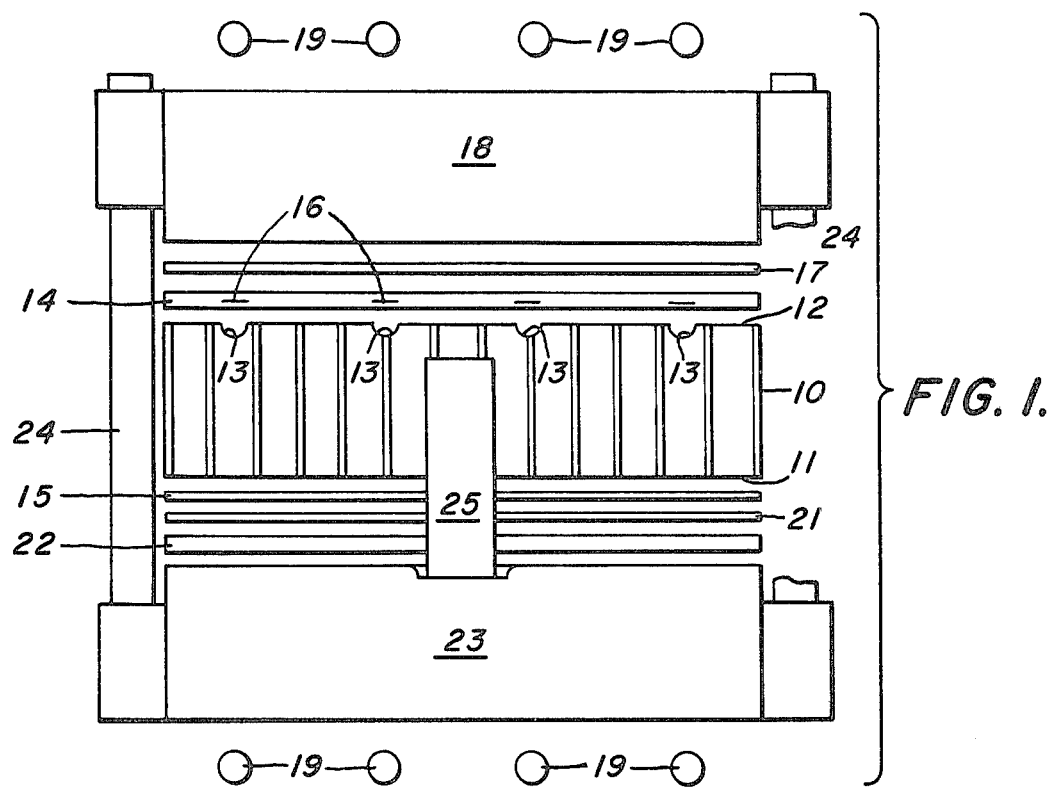
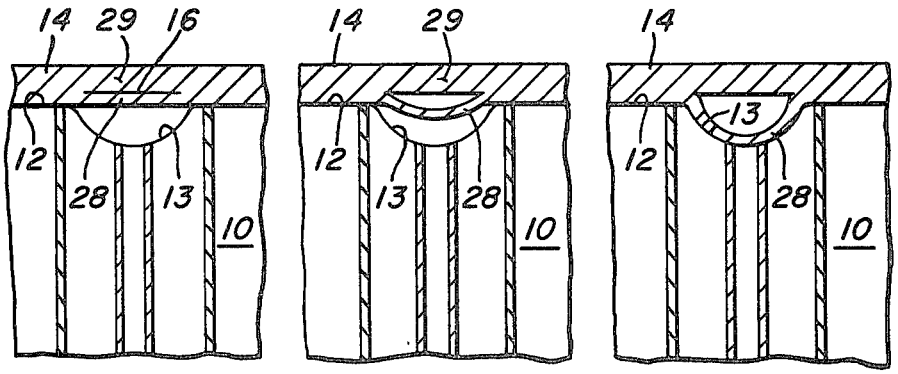
FIG. 1.
FIG. 2A.   FIG. 2B.   FIG. 2C.

METHOD OF MAKING AN ACTIVELY-COOLED TITANIUM STRUCTURE

BACKGROUND OF THE INVENTION

This invention is addressed to a method of making a diffusion bonded composite structure consisting of metal selected from the group consisting of titanium and titanium-based alloys and comprising a relatively fragile cellular core component bonded between face sheet components, one of which includes an expanded internal cooling channel produced by superplastic forming through the use of an inert gas supply to displace one wall surface of the face sheet component into machined recesses in the cellular core component where the displaced wall surface is diffusion bonded to the cellular core component.

Actively-cooled panel structures have been proposed in the past for use with various articles of manufacture including aircraft and particularly supersonic aircraft. Recent technological concepts include the proposal for a fuel-cooled honeycomb panel. Apart from the concept of an actively-cooled panel, a titanium honeycomb panel with evacuated cells will provide more effective insulation than a similar aluminum structure. Moreover, aerospace structures made from titanium or titanium alloys have a greater strength to weight ratio as compared to similar structures made from aluminum. In addition, titanium aerospace structures will withstand higher temperatures than aluminum structures.

In my prior U.S. Pat. No. 4,013,210, assigned to the Assignee of this invention, there is disclosed a method of producing a composite structure consisting of a honeycomb panel joined to other structure by diffusion bonding to form a load-carrying member. The component parts of a composite structure are urged together under a moderate pressure transmitted through a glass pad to assure a uniform contact force while carrying out the diffusion bonding process. Disclosed in U.S. Pat. No. 3,633,267 issued to the same Assignee as this invention in the name of Czeslaw Deminet et al., is a method of diffusion bonding a metallic honeycomb structure to face sheets. A honeycomb core is placed in a furnace with a face sheet held above the honeycomb core by means of heatyieldable spacers. When the temperature in the furnace is elevated to a diffusion bonding temperature, e.g., 1700° F., the heat-yieldable spacers deform and the upper face sheet descends into contact with the honeycomb core. A compressive force is applied through a heat-yieldable glass pad to insure that all portions of the face sheet are urged under uniform pressure into proper diffusion bonding contact with the honeycomb core.

Active-cooling by fuel-cooled passageways in a composite honeycomb structure offers many advantages particularly at selected locations in hypersonic aircraft. A fuel-cooled panel structure is particularly useful at sites where, during a mission, temperatures are encountered which are higher than acceptable even when the more effective insulation is provided by evacuated cells in a titanium honeycomb structure. The present invention is, therefore, addressed to providing a titanium honeycomb structure with evacuated cells together with passageways for a coolant medium in a face sheet of the honeycomb structure. A major advancement in the art by the present invention is active cooling of the face sheet of the panel to thereby prevent overheating of the skin due to aerodynamic friction. The technique of superplastic forming of titanium or titanium alloys is utilized as part of the present invention to form the ducting within a face sheet of the composite structure. The concept of superplastic forming is per se known in the art and discussed in recent literature include an article by J. W. Edington, entitled "Physical Metallurgy of Superplastic Metals Technology", *Metals Technology*, March 1976, pages 138–153. Superplastic forming is also discussed in a paper by F. H. Froes et al entitled "Microstructural Control in Titanium Alloys for Superplastic Behavior" presented at the "Forging and Properties of Aerospace Materials Conference", Leeds, England, Jan. 5–7, 1977. Superplastic forming is a process founded by the extreme ductility of certain metals when deformation is carried out at a temperature above about one-half the melting point of the metal. The forces required to deform titanium or known present-day titanium alloys by superplastic forming are relatively small, e.g., as low as 100 psi. In the superplastic forming process, the metal undergoing deformation behaves in a manner similar to hot glass or thermoplastic polymers when deformed.

SUMMARY OF THE INVENTION

It is an object of the present invention to provide a method of making a diffusion bonded composite structure of material selected from the group consisting of titanium and titanium-based alloys wherein a cellular core component is diffusion bonded between face sheets, one of which includes a cooling channel which is expanded by superplastic forming and the expanded wall surface is diffusion bonded with the cellular core components.

It is another object of the present invention to provide a method of diffusion bonding combined with superplastic forming to make a composite structure of material including titanium and titanium-based alloys to provide active cooling of the composite structure.

It is a further object of the present invention to provide a method of fabricating a titanium or titanium alloy composite structure including an actively-cooled face sheet used to form at least part of the skin of an aircraft, a spacecraft vehicle or the like wherein the composite structure provides an actively-cooled and heat-insulating panel at lower cost as compared to other actively-cooled honeycomb structures.

In accordance with the present invention, there is provided a method of making a composite metallic structure of material selected from the group consisting of titanium and titanium-based alloys, the method including the steps of providing a cellular core component of the metallic material, the core component having a plurality of cellular core elements with exposed core wall end surfaces, forming a desired pattern of recesses in the core wall end surfaces at one face of the core component, providing a face sheet component of the metallic material having an internal opening defined therein to extend along the desired pattern of recesses formed within the cellular core component, assembling the face sheet component and the cellular core component in a furnace with the internal opening in the face sheet component superimposed and aligned with the pattern of recesses in the core component, coupling an inert gas supply to the internal opening in the face sheet component, heating the components in the furnace under high vacuum to a diffusion bonding temperature, urging the face sheet into contact with the core component through a yieldable member under a contact pressure without deformation to the cellular core component to diffusion bond the components together, delivering an inert gas from the supply into the internal opening to expand the face sheet wall surface into the recesses in the cellular core component by superplastic forming for diffusion bonding, and diffusion bonding the expanded face sheet wall surface to the recessed core end wall surfaces in the cellular core component.

In the preferred form of the present invention, the method further includes bonding a second face sheet component to the core component at the side opposite the face sheet having the internal opening therein. The desired pattern of the internal opening in the face sheet is formed, if desired, by selecting two sheets, one having a selectively-located coating of bond-inhibiting material, arranging the sheets with the bond-inhibiting material therebetween in a furnace under a high vacuum, and diffusion bonding the sheets together along the uncoated surface areas between the sheets.

These features and advantages of the present invention as well as others will be more fully understood when the following description is read in light of the accompanying drawings, in which:

FIG. 1 is a side elevational view showing the arrangement of components and other parts in a furnace for carrying out the method of the present invention;

FIGS. 2A-2C illustrate consecutive steps in the superplastic forming of the cooling channel in a face sheet component according to the method of the present invention;

Figure 3:
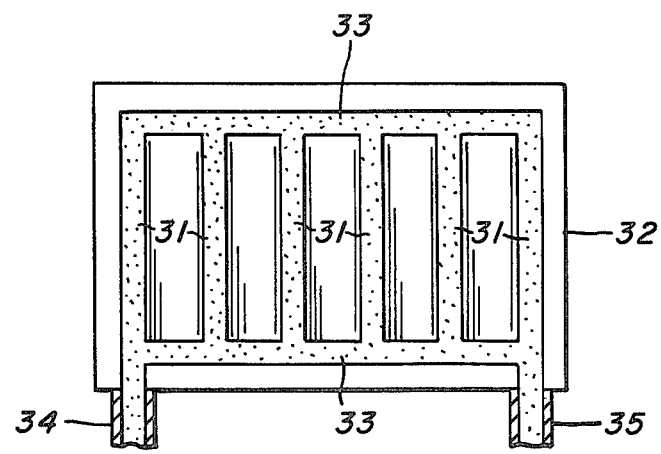
FIG. 3 is a plan view of a face sheet component with a patterned coating thereon to form the internal cooling channel.

The arrangement of parts illustrated in FIG. 1 is utilized according to the preferred method of the present invention to produce a diffusion bond, actively-cooled titanium honeycomb panel. A honeycomb blanket forms a cellular core 10 made of material selected from the group consisting of titanium and titanium alloys. The cellular core component includes a plurality of core wall surfaces which terminate in planes suitable for diffusion bonding to face surfaces of sheet components. The lower core end wall surfaces 11 terminate in a single plane while the upper core end wall surfaces 12 include a pattern of recesses 13. The recesses 13 are provided in the end wall surfaces of the cellular core typically along parallel, spaced-apart tracks across the cellular core. The cellular core is disposed between an upper face sheet component 14 and a lower face sheet component 15. As will be described in greater detail hereinafter, the upper face sheet component 14 includes an internal passageway 16 which is expanded by superplastic forming to provide active cooling of the face sheet component in the honeycomb panel. Above the upper face sheet 14 is a slip sheet 17. Above the slip sheet is a platen 18 which functions as a dead weight for applying pressure between the underlying components for diffusion bonding within the furnace. A furnace is not specifically illustrated in the drawings and may take the form of any well known structure. The furnace includes suitable heating means, such as quartz lamps 19 to heat the components of the composite structure to a bonding temperature typically about 1700° F., but usually no greater than 1750° F. The lower face sheet 15 rests upon a slip sheet 21. A glass pad 22 made from pyrex glass is interposed between slip sheet 21 and a lower platen 23.

The slip sheets 17 and 21, typically made of titanium material, prevent dimpling of the face sheet components 14 and 15 into the honeycomb blanket. The slip sheets 17 and 21, glass pad 22 and platens 18 and 23 each has a coating of boron nitride on their face surfaces to prevent any chemical interaction during the diffusion bonding process. Vertical guide posts 24 are arranged at various locations about the periphery of the cellular core 10, face sheets 14 and 15, slip sheets 17 and 21 and glass pad 22 in the furnace to maintain these parts in their proper alignment with one another. Glass spacer blocks 25 are used in the furnace to initially hold the upper platen 18 above the other components in the furnace. The various components shown in FIG. 1 have been illustrated in a vertically, spaced-apart relation, for the purpose of clarity. The only vertical space between components during initial set-up procedure is between the dead weight 18 and slip sheet 17 as provided by the glass spacer blocks 25, only one of which is shown.

To carry out the diffusion bonding of face sheets 14 and 15 onto the honeycomb blanket, a vacuum is drawn in the furnace. The furnace is evacuated to a suitable level such as, for example, approximately $10^{-5}$ millimeters of mercury. After the vacuum has been drawn, the furnace is heated to a temperature of about 1700° F. by energizing the quartz lamp 19. However, in the heating process, it is preferred to heat the furnace initially to a temperature of about 1500° F. as disclosed in my prior U.S. Pat. No. 4,013,210. At a temperature of 1500° F., the glass material forming spacer blocks 25 becomes soft to the extent that the dead weight 18 descends slowly pushing against slip sheet 17 and upper face sheet 14 to bring the upper face sheet into contact with the top surface of cellular core 10. As the spacer blocks continually soften, their effective length continually decreases so that the entire weight of the platen is carried by the superimposed arrangement of components upon the lower platen 23. The contact pressure between the components is very moderate, for example, between about one-half pound per square inch and one pound per square inch to avoid a significant deformation of the relatively fragile cellular core. The pressure exerted by the upper plate 18 is also passed through the glass pad 22 which becomes soft at the elevated temperature in the furnace. Yielding of the glass material forming glass pad 22 equalizes the pressure between the contacting face surfaces of the superimposed components. The temperature in the furnace is then raised to a suitable level for diffusion bonding which is, for example, between 1600° F. to 1700° F. and held at a preselected bonding temperature within this temperature range for a suitable period of time, typically between 2 hours and 8 hours. The diffusion bonding temperature for carrying out the method of the present invention does not exceed 1750° F. By exposing the surfaces of the components which undergo diffusion bonding to a vacuum at the elevated temperature for a period of time, substantially all the contamination is removed from the surfaces so that when the components are brought together at a temperature of about 1500° F., the titanium at the bonding surface more readily deforms into a diffusion bond.

Prior to the actual diffusion bonding process and during the assembly of component parts in the furnace, a manifold for an inert gas supply is brought into a gas-conducting relation with the passageway 16 in the upper face sheet 14. A manifold, not shown, is connected to one end of the passageway and either a branch part of the manifold or a stop block is connected to the other end or each of the remaining ends of the passageway, depending upon the configuration of the passageway. After the face sheets 14 and 15 are diffusion bonded to the cellular core 10, an inert gas pressure is developed within the passageway to carry out superplastic forming. As noted hereinbefore, superplastic forming is a phenomenon where deformation of the titanium sheet is possible under moderate pressures when the metal is heated to about one-half but usually not exceeding 0.6 of its melting temperature. The titanium material is suitably processed so that it has a very fine grain structure. An inert gas, such as argon, delivered at a pressure of about 100 psi is suitable for expanding the passageway by superplastic forming.

FIGS. 2A–2C illustrate the consecutive steps in the superplastic forming of the cooling channel. In FIG. 2A, the passageway 16 in the upper face sheet 14 is located directly above the pattern of recesses 13 in the cellular core 10. The recesses and the passageway 16 are located to coextend along the same pattern. In FIG. 2B, initial expansion by superplastic forming has occurred. It will be observed that the lower wall 28 of the passageway 16 in the face sheet 14 is displaced downwardly into the recesses 13 in the cellular core whereas the upper wall 29 of the passageway does not undergo expansion principally because of the support provided by the slip sheet 17 under the dead weight of platen 18. Moreover, the thickness of wall 28 as compared with the thickness of wall 29 at the sides of passageway 16 is much less whereby the resistance to superplastic deformation is far less in regard to wall 28. In FIG. 2C, the channel has undergone complete expansion under the pressure of the inert gas. The outer surface to wall 28 is displaced into contact with the upper terminal edge of recesses 13 in the cellular core 10. Inasmuch as the superplastic forming takes place in the furnace after the diffusion bonding of the face sheets onto the cellular core, the environment within the furnace is maintained throughout the superplastic forming so that diffusion bonding occurs between the displaced surface of wall 28 and the end wall surfaces defining the recesses 13 in the cellular core. The moderate inert gas pressure developed for superplastic forming is maintained throughout the diffusion bonding process. After this diffusion bonding is completed which occurs in the same manner as hereinbefore described in regard to the bonding of face sheet components onto the cellular core, the supply of inert gas is terminated and the furnace is allowed to return to ambient temperature and atmospheric pressure. Throughout the diffusion bonding process as well as the superplastic forming, the vacuum within the furnace insures that evacuated cells are formed within the honeycomb blanket since the ends of the cells are completely sealed by the diffusion bonding of face sheet components thereto.

Figure 4:
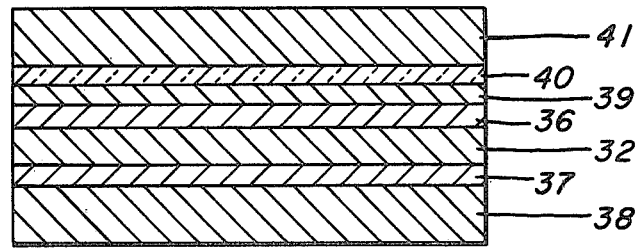
FIG. 4 illustrates the arrangement of parts for diffusion bonding of sheets to form a face sheet component according to the method of the present invention.

The passageway 16 may be formed by any suitable well-known technique. However, according to the present invention, it is preferred to provide two titanium sheet members which are diffusion bonded together after the desired pattern of the coolant passageway is defined between the mating surfaces of the sheets. Silk-screening techniques are particular suitable and it is preferred to provide a coating on one of the face sheets that will inhibit diffusion bonding at the coated area but, at the same time, define boundaries about which diffusion bonding occurs. In FIG. 3, a typical pattern is shown in which the coated areas 31 are parallel and spaced-apart strips extending transversely across a sheet member 32. The ends of the coated areas 31 are joined together by coated areas 33 which ultimately form manifolds to supply a coolant to channels formed out of areas 31 after expansion. Fittings 34 and 35 made from stainless steel, for example, are used to supply an inert gas from a supply manifold to the passageway for expansion by superplastic forming. After the desired pattern is coated with a bond-inhibiting material, such as boron nitride, the two sheet members 32 and 36 are placed face-to-face with the coated areas therebetween in a furnace to carry out diffusion bonding between the uncoated surface area between the sheet members. FIG. 4 illustrates the arrangement of parts in a furnace which is not shown. The sheet members 32 and 36 are supported upon a lower slip sheet 37 which, in turn, is carried by a lower platen 38. The upper surface of sheet member 36 carries a slip sheet 39 which, in turn, carries a glass pad 40 forming a yieldable member under the imposed load developed by the weight of an upper platen 41. Diffusion bonding is carried out within the furnace after evacuated to about $10^{-5}$ millimeters of mercury and at a temperature of about 1700° F. The bonding environment within the furnace is maintained for a period of about between 2–8 hours. After the sheet members are diffusion bonded together, they form an upper face sheet component 14.

Although the invention has been shown in connection with a certain specific embodiment, it will be readily apparent to those skilled in the art that various changes in form and arrangement of parts may be made to suit requirements without departing from the spirit and scope of the invention.

I claim:
1. A method of making a diffusion bonded composite metallic structure of material selected from the group consisting of titanium and titanium-based alloys, said method including the steps of:

providing a cellular core component of said metallic member, said cellular core component having a plurality of cellular core elements with exposed core wall end surfaces, forming a pattern of recesses in the core wall end surfaces at one face of the cellular core component, providing a face sheet component of said metallic material having an internal opening defined therein to extend along the pattern of recesses in the cellular core component, assembling the face sheet component and the cellular core component in a furnace with the internal opening in the face sheet component superimposed and aligned with the pattern of recesses in the cellular core component, coupling an inert gas supply to the internal opening in the face sheet component, heating the components in the furnace to a bonding temperature and urging the face sheet component into contact with the cellular core through a yieldable medium against the opposed surface of said face sheet component for a sufficient period of time to diffusion bond the cellular core component to the face sheet component, the contact pressure being less than a pressure which would cause significant deformation of the cellular core component, delivering an inert gas into the internal opening within the face sheet component while in a heated state in the furnace to expand the face sheet wall surface to the internal opening into said recesses in the cellular core component by superplastic forming, and maintaining the expanded face sheet wall surface under sufficient contact pressure within the recesses in the cellular core component for a period of time to diffusion bond the expanded face sheet wall surface to the cellular core component.

2. The method according to claim 1 including the further step of selecting a second face sheet of said metallic material, said step of assembling including arranging the cellular core component between said face sheet component and said second face sheet for diffusion bonding into an integral structure by said step of heating.

3. The method according to claim 1 wherein said step of forming a pattern includes machining recesses into the core end wall surfaces of the cellular core component.

4. The method according to claim 3 wherein said cellular core component comprises a honeycomb core of said metallic material.

5. The method according to claim 1 wherein said providing a face sheet component includes the steps of selecting two sheet members consisting of said metallic material, depositing a patterned coating of bond-inhibiting material onto a face surface of at least one sheet member, assembling the outer and inner face sheets in a face-to-face relation such that the patterned coating of bond-inhibiting material lies between the sheet member, heating the sheet member in the furnace to a bonding temperature and urging the sheet member into mutual contact under a force passed through a yieldable medium for a sufficient period of time to cause diffusion bonding between mutually-contacting uncoated surface areas between the sheet members.

6. The method according to claim 5 wherein said bond-inhibiting material is boron nitride.

7. The method according to claim 5 wherein said depositing a patterned coating includes defining by silk-screening a desired pattern on one face surface of a sheet member for depositing the coating of said bond-inhibiting material.

8. The method according to claim 5 wherein the patterned coating includes spaced-apart parallel strips substantially traversing across the face of one sheet member to provide correspondingly-arranged coolant passageways.

9. The method according to claim 8 wherein the patterned coating further includes manifold strips interconnecting the ends of said spaced-apart and parallel strips to provide correspondingly-arranged coolant supply manifolds.

* * * * *